DIGITAL PULSE-TRANSLATING CIRCUIT

Filed Sept. 16, 1959

INVENTOR.
LOUIS J. KABELL
BY Lyon & Lyon
ATTORNEYS.

United States Patent Office 3,056,891

Patented Oct. 2, 1962

3,056,891

DIGITAL PULSE-TRANSLATING CIRCUIT

Louis J. Kabell, Palo Alto, Calif., assignor to A. B. Dick Company

Filed Sept. 16, 1959, Ser. No. 840,376
4 Claims. (Cl. 307—88.5)

Figure 1:
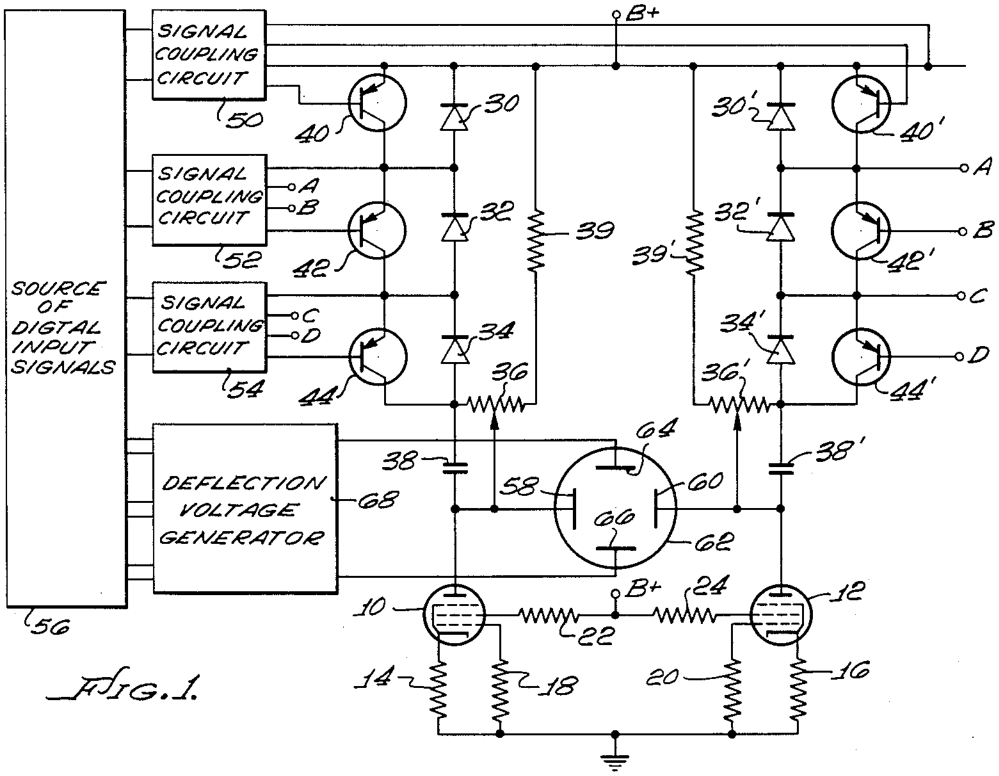

This invention relates to circuits for applying pulses from a source to a load and, more particularly, to improvements in such circuits wherein it is required to maintain the conductive and capacitive coupling between the source and the load at extremely small values to prevent interaction between the circuits and to permit high-speed switching.

In an application for a Deflection Circuit, filed August 4, 1958, Serial No. 753,062, now Patent No. 2,907,899, by this inventor and Earle D. Jones, there is described a simple circuit arrangement for producing stable deflection voltages in response to digital input signals for deflecting a cathode-ray beam. Essentially this is done by employing two series-connected strings of the Zener diodes (for deriving the required push-pull voltage) through which a constant current is drawn. Each Zener diode in a string is paralleled with a switch comprising a transistor. The Zener diodes are connected so that their characteristic back-voltage drops are developed. By suitably opening and closing the transistor switches in response to the input signals, current can be shunted around or passed through the Zener diodes to selectively develop or remove the back-voltage drop, thereby varying the voltage available across the entire string. This voltage across the entire string is the deflection voltage which is applied to a cathode-ray tube for positioning its cathode-ray beam in accordance with the input signal applied to the circuit.

In order to develop the push-pull deflection signals requisite for operating the deflection plates of a cathode-ray tube, two series strings of Zener diodes are provided with associated transistor switches, one string of which is conducting during standby period and the other string of which is not conducting during standby period. In order to properly operate the circuit, it was necessary to render conductive a nonconductive transistor switch and simultaneously render nonconductive a conductive transistor switch. This required a digital input signal to be converted into a pair of opposite-phase digital signals. To accomplish this operation, the source of digital input signals were coupled to the respective conductive and nonconductive transistor switches by means of transformers having a primary winding and two secondary windings. The system operated properly and the arrangement for applying digital input signals for controlling the deflection circuit is quite inexpensive. Operation was adequate as long as the control-pulse duty cycle was held to a relatively low value. However, as the duty cycle is made greater, the coupling transformer must be made to pass lower frequency signals in order to properly pass long trains of high-duty cycle pulses. This requirement for a transformer can be met. However, the coupling transformer must be large and expensive in order to pass the requisite wide range of frequencies.

Accordingly, an object of this invention is the provision of a circuit for coupling pulses to a load which is inexpensive and operable over a wide range of pulse repetition frequencies and duty cycles.

Another object of the present invention is the provision of a novel coupling circuit between a source of pulses and a load.

Yet another object of the present invention is to provide an improved coupling circuit between a source of digital input pulses and a digital deflection-voltage generator.

These and other objects of the invention are achieved by providing a circuit in place of the coupling transformers previously mentioned, wherein an oscillator circuit is maintained quiescent by means of withholding therefrom the required operating potential. Such means comprises a gate which during the standby interval is maintained closed. Such gate is opened each time a pulse is applied thereto from the source of digital pulses. Thus the oscillator is enabled to oscillate at a suitable frequency over an interval equal to the width of the pulse applied to the gate to maintain it open. The oscillator load comprises a primary winding of a transformer having two secondary windings. Rectifiers are connected respectively to the secondary windings for deriving therefrom out-of-phase pulses which are applied to the following conductive and nonconductive switching transistors to reverse their states of conduction.

Figure 2:
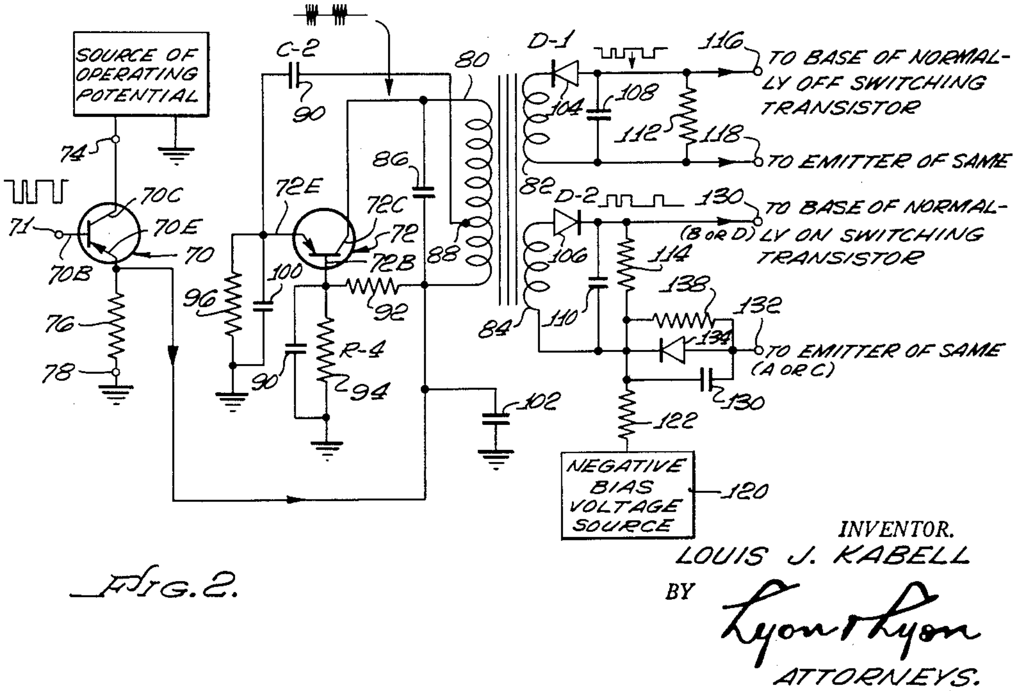

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a circuit diagram of a deflection voltage generator shown to afford an understanding of the utility of this invention; and FIGURE 2 is a circuit diagram of an embodiment of the invention.

Referring now to FIGURE 1, there may be seen an arrangement for providing deflection voltages in response to digital signals from six input channels so that a cathode-ray tube beam may be positioned to one of 64 positions on an 8 x 8 matrix (zero signal input being considered as one input). The FIGURE 1 is substantially the same FIGURE 1 as is shown in the previously mentioned application for Kabell and Jones. This circuit is being shown in order to provide a better appreciation for the invention herein that is being combined therewith. Three of the six channels which are shown are decoded to determine one of eight horizontal-deflection positions. A circuit for this is shown in detail. The remaining three channels are decoded to give one of eight vertical-deflection positions. This requires identical circuitry with that shown for the horizontal-deflection voltage generator and therefore is shown in block-diagram form for simplicity. The actual deflection voltages are developed across voltage-reference diodes which are switched in or out of the deflection circuit by transistors according to the digital-input information. These are diodes of the type which develop a Zener, or avalanche, effect when a voltage is applied across them with a reverse polarity. In FIGURE 1 there are provided two constant-current sources 10, 12. These comprise pentode tubes, respectively having cathode-bias resistors 14, 16, and having their grids returned to ground through resistors 18, 20. The screen grids are connected to a source of grid potential through resistors 22 and 24. As a result, pentode tubes 10, 12 are maintained conductive. In a preferred embodiment of the invention these tubes were biased to provide a direct current of 5 milliamperes to their associated networks. The associated networks for the tube 10 includes a first series diode string having reference diodes 30, 32, 34. These are connected in series, anode-to-cathode and backwards, between a source of positive potential and through a potentiometer 36 to the anode of tube 10. The sufficient current flow through a diode is provided to develop its characteristic back-voltage drop. A compensating capacitor 38 is connected between one end of the potentiometer and the anode of tube 10. The other end of potentiometer 36 is connected to B+ through a resistor 39.

A transistor is provided for each one of the diodes 30, 32, 34 in the series string. Each one of these transistors 40, 42, 44 has its emitter connected to the cathode of the diode with which it is associated and its collector connected to the anode of the diode with which it is associated. The emitter of transistor 40, as a result, is also connected to the source of B+, and the collector of the transistor 44 is connected to one end of the potentiometer 36.

A second series-string of reference diodes 30′, 32′, 34′, is provided, each one of which is associated with and has substantially identical charactistics as the corresponding diodes 30, 32, 34 in the first series string. These diodes are connected in like manner between the B+ source and the plate of tube 12 through a potentiometer 36′. These diodes also develop their characteristic back-voltage drop when a sufficient current flows through them. The other end of the potentiometer 36′ is connected to B+ through a resistor 39′. A compensating capacitor 38′ is also connected between the other end of the potentiometer 36′ and the anode of tube 12. Transistors 40′, 42′, and 44′, respectively, have their emitters and collectors connected to the cathode and anode of the associated diodes 30′, 32′, and 34′. As a result, the emitter of transistor 40′ is connected to B+ and the collector of transistor 44′ is connected to the potentiometer 36′.

The arrangement employed for the transistors is such that in the quiescent state the transistors associated with the first series-string of diodes are not conducting, and a constant current flows through the reference-voltage diodes, and develops their characteristic back voltages. In the quiescent state, the transistors 40′, 42′, and 44′ are biased to conduct heavily with the result that substantially no reference current flows through the reference diodes 30′, 32′, and 34′. The transistors 40, 40′ receive the out-of-phase digital-input signals from a signal-coupling circuit 50. Similar signal-coupling circuits 52, 54 respectively drive transistors 42, 42′ and 44, 44′. The digital-input signals to the respective signal-coupling circuits are derived from a source of digital-input signals 56. In the circuit as it appeared in the previously mentioned application for Kabell and Jones, the signal-coupling circuits were transformers which had their primary windings coupled to the source of digital-input signals and two secondary windings for providing the requisite out-of-phase transistor driving signals.

The digital-input signals which are applied to any one of a combination of signal-coupling circuits reverse the standby conduction, nonconduction states of the associated transistors whereby the voltage available for deflecting the horizontal-deflection plates 58, 60 of the cathode-ray tube 62 is variable accordingly. The vertical deflection plates 64, 66 are driven from a deflection-voltage generator 68, comprising a rectangle representing the circuit just described. The deflection voltage generator 68 is also driven from the source of digital-input signals.

It should be appreciated that any combination of six binary digital signals may be applied to the two deflection voltage generators (the ones shown in detail as well as the one represented by the rectangle 68) for the purpose of positioning a cathode-ray beam in one of 64 positions. It was found that with the circuit shown, the transformer costs become rather prohibitive when with the limited driving power available from the pulse source such simple transformer coupling is sought to be used at high pulse repetition frequencies and a high duty cycle. Thus, to effectuate high-speed and/or high-duty cycle operation, a circuit such as is shown in FIGURE 2 was inserted in place of each one of the signal-coupling circuits. Thus, for the arrangement shown in FIGURE 1, a FIGURE 2 was provided for the signal-coupling circuit 50, and another FIGURE 2 was provided for the signal-coupling circuit 52, and a third FIGURE 2 was provided for the signal-coupling circuit 54.

The circuit shown in FIGURE 2 comprises a first transistor 70, which acted as a gate, and a second transistor 72, which acted as an oscillator. The base 70B of the transistor 70 was connected to a terminal 71 to receive digital pulses from the source 56. The collector 70C of the transistor 70 is connected to a terminal 74, to which the operating potential (in this case, −24 volts) is applied. The emitter 70E of the transistor 70 is connected through a load resistor 76 to a second terminal 78, which in turn is connected to ground. Transistor 70 is operated as an emitter-follower and is maintained nonconductive until, in the presence of a pulse, it is rendered conductive.

The oscillator transistor 72 has a tuned load, consisting of the primary winding 80 of a transformer, which has two secondary windings 82, 84 as well. A capacitor 86 serves to tune the primary winding 80. The collector 72C is connected to one side of the primary winding 80. The emitter 70E of the transistor 70 is connected to the other side of the primary winding 80.

A tap 88 on the primary winding 80 is connected to the emitter 72E of the transistor 72 through a feedback capacitor 90. A first resistor 92 connects between the side of the primary winding 80 and the base 72B of the transistor 72. A second resistor 94 connects the base to ground, and a third resistor 96 connects the emitter 72E to ground. A first bypass capacitor 98 bypasses the resistor 94. A second bypass capacitor 100 bypasses the resistor 96. A third capacitor 102, which is connected across the resistor 76, effectively serves as a bypass therefor.

It should be apparent that no operating potential can be applied to the oscillator portion of the circuit unless the first transistor 70 is rendered conductive. Thus, effectively, the oscillator is quiescent except when a digital pulse is applied to the terminal 72, whereupon the oscillator is enabled to become oscillatory for the interval of the duration of the digital pulse.

Out-of-phase outputs are derived by the secondary windings 82, 84. These are applied respectively to rectifiers 104, 106. There is also provided filter condensers, respectively 108, 110, which are connected across the output of the rectifiers. Resistors 112, 114 respectively are connected in parallel with the respective condensers 108, 110. The rectified output of the secondary winding 82 is applied to output terminals 116, 118. These terminals are respectively connected to the base of a normally off switching transistor and to the emitter of a normally off switching transistor.

The pulse output derived from the other secondary winding 84 obviously will be applied to a normally on switching transistor. It is necessary to provide a bias to maintain the normally on switching transistor conductive. This is achieved by means of a bias voltage source 120, which is connected to the secondary winding 84 through a resistor 122. The output of the rectifier 106 is applied to one output terminal 130. The other output terminal 132 is connected to the resistor 122 through a silicon diode 134. A shunting capacitor 136 and resistor 138 are connected across the silicon diode. The terminals 130, 132 are respectively connected to the base of a normally on transistor and to the emitter of this transistor. By means of the circuit shown, silicon diode 134 insures that in the quiescent state the base of the transistor is more negative than the emitter, whereby it will be maintained conductive. The pulses received at the terminal 130 from the rectifier 106 are positive-going, thus raising the potential at the base of the normally on transistor above that of the emitter whereby it is rendered nonconductive. Simultaneously, the base of the normally off transistor receives negative-going signals from the terminal 116, whereby the transistor may be driven into saturation.

In an embodiment of the invention which was built, the circuit was tuned to oscillate at three megacycles, and bursts of three-megacycle voltage corresponding to deflection-control pulses appeared at the secondary windings 82, 84. These three-megacycle voltage bursts were rectified and filtered by the respective circuits and thus were reformed into keying pulses which were out of phase as required for reversing the conduction and nonconduction states of the respective transistors. By converting the input pulses into bursts of high-frequency oscillation, the requirements for the transformer that it pass low as well as high frequencies for high-duty cycle pulse trains was eliminated. In an embodiment of the invention which was built, the transformer comprised a three-section Teflon bobbin contained in a 9/16 inch diameter cup core. The primary winding consisted of ten turns of No. 28 Formex insulated magnet wire with the feedback tap at three turns from the finish end of the winding. Each secondary winding consisted of one turn of No. 28 Formex magnet wire. The maximum interwinding capacitance was less than three mmfd. The circuit shown in FIGURE 1 was thus able to be operated at duty cycles ranging from low through extremely high frequencies.

There has accordingly been described and shown herein a novel and useful circuit for improving the operation of a deflection generator wherein digital pulses for controlling the deflection voltages are converted into bursts of oscillation to simplify and render more inexpensive the circuitry required for applying the digital signals as out-of-phase digital signals to switching transistors.

I claim:

1. A circuit for applying pulses from a source to a load comprising a first and second transistor each having an emitter, collector, and base, first and second terminal means for applying operating potential to said transistors, means connecting said first transistor collector to said first terminal, a first resistor connecting said first transistor emitter to said second terminal means, a transformer having a primary winding and two secondary windings, a tuning capacitor connected across said primary winding, means connecting one side of said primary winding to said first transistor emitter, means connecting the other side of said primary winding to said second transistor collector, a tap on said primary winding, a feedback capacitor connecting said second transistor emitter to said tap, a second resistor connected between said second transistor base and said one side of said primary winding, a third resistor connected between said second transistor emitter and said second terminal means, a fourth resistor connected between said second transistor base and said second terminal means, means for applying pulses from said source to said first transistor base to render said first transistor conductive responsive to each pulse, a separate rectifier connected to each secondary winding to provide rectified out-of-phase pulses, and means for applying said rectified out-of-phase pulses to said load.

2. In a circuit for producing stable deflection voltages from a source of digital pulses, said circuit being of the type wherein there is a first series of transistors which are conductive in the standby state and a second series of associated transistors which are not conductive in the standby state and in response to each digital pulse it is required to reverse the states of conduction of associated transistors in said first and second series, the improvement in applying a digital pulse from said source to transistors in said first and second series comprising for each transistor in the first series and associated transistor in the second series a quiescent oscillator having an output load, said output load including a transformer having a tuned primary winding and two secondary windings for providing opposite-phase outputs, means for energizing said quiescent oscillator, a closed gate connected between said means for energizing said quiescent oscillator and said quiescent oscillator, means for applying pulses from said source to said closed gate to open said gate for the duration of each of said pulses whereby said quiescent oscillator is energized to oscillate for the duration of said pulse, a separate rectifier means connected to each of said transformer secondary windings for rectifying the output thereof, means for connecting one of said rectifier means to a transistor in said first series to render it nonconductive in the presence of an output, and means for connecting the other of said rectifier means to the associated transistor in said second series to render it conductive in the presence of an output.

3. In a circuit for producing stable deflection voltages as recited in claim 2 wherein said quiescent oscillator comprises a transistor having an emitter, collector and base, means connecting said collector to said tuned primary winding, a tap on said tuned primary winding, a capacitor connecting said tap to said emitter, a first resistor connected between said tuned primary winding and said base, a second resistor having one end connected to said base, a third resistor having one end connected to said emitter and a common terminal to which said other ends of said second and third resistors are connected.

4. In a circuit for producing stable deflection voltages from a source of digital pulses, said circuit being of the type wherein there is a first series of transistors which are conductive in the standby state and a second series of associated transistors which are not conductive in the standby state and in response to each digital pulse it is required to reverse the states of conduction of associated transistors in said first and second series, the improvement in applying a digital pulse from said source to transistors in said first and second series comprising for each transistor in the first series and associated transistor in the second series a first and second transistor each having an emitter, collector and base, first and second terminal means for applying operating potential to said transistors, means connecting said first transistor collector to said first terminal, a first resistor connecting said first transistor emitter to said second terminal means, a transformer having a primary winding and two secondary windings, a tuning capacitor connected across said primary winding, means connecting one side of said primary winding to said first transistor emitter, means connecting the other side of said primary winding to said second transistor collector, a tap on said primary winding, a feedback capacitor connecting said second transistor emitter to said tap, a second resistor connected between said second transistor base and said one side of said primary winding, a third resistor connected between said second transistor emitter and said second terminal means, a fourth resistor connected between said second transistor base and said second terminal means, means for applying pulses from said source to said first transistor base to render said first transistor conductive responsive to each pulse, a separate rectifier connected to each secondary winding to provide rectified out-of-phase pulses, means for connecting the output of one of said rectifiers to a transistor in said first series for rendering it nonconductive in the presence of an output and means for connecting the output of the other of said rectifiers to the associated transistor in said second series for rendering it conductive in the presence of an output.

References Cited in the file of this patent

UNITED STATES PATENTS

| | | |
|---|---|---|
| 2,509,337 | Earp | May 30, 1950 |
| 2,556,286 | Meacham | June 12, 1951 |
| 2,808,513 | Maynard | Oct. 1, 1957 |
| 2,839,686 | Thompkins | June 17, 1958 |
| 2,841,700 | Hallden | July 1, 1958 |
| 2,907,899 | Kabell | Oct. 6, 1959 |
| 2,924,786 | Talkin | Feb. 9, 1960 |
| 2,928,938 | Forbath et al. | Mar. 15, 1960 |